(12) United States Patent
Richardson et al.

(10) Patent No.: US 10,986,507 B2
(45) Date of Patent: Apr. 20, 2021

(54) METHOD AND APPARATUS FOR MONITORING SAS CPAS PERFORMANCE IN CBRS SYSTEMS

(71) Applicant: Telefonaktiebolaget LM Ericsson (publ), Stockholm (SE)

(72) Inventors: Simon Richardson, Athlone (IE); Mapfumo Chidzambwa, Athlone (IE); Pedro Henrique De Oliveira Mota, Athlone (IE); Nicholas Fitzgerald, Athlone (IE); Andru M. MacGiolla Ri, Athlone (IE); Don McCarthy, Athlone (IE); Mayke Nespoli, Athlone (IE); Denis O'Connor, Athlone (IE); David O'Shaughnessy, Athlone (IE); Bujji Krishna Raju Babulingam, Athlone (IE); Yang Zhao, Athlone (IE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/712,142

(22) Filed: Dec. 12, 2019

(65) Prior Publication Data
US 2020/0236557 A1    Jul. 23, 2020

Related U.S. Application Data

(60) Provisional application No. 62/793,448, filed on Jan. 17, 2019.

(51) Int. Cl.
*H04W 16/14* (2009.01)
*H04W 24/04* (2009.01)
(Continued)

(52) U.S. Cl.
CPC .......... *H04W 16/14* (2013.01); *H04W 24/04* (2013.01); *H04W 28/26* (2013.01); *H04W 88/182* (2013.01)

(58) Field of Classification Search
CPC ..... H04W 16/14; H04W 28/26; H04W 24/04; H04W 88/182
See application file for complete search history.

(56) References Cited

U.S. PATENT DOCUMENTS

| | | | |
|---|---|---|---|
| 2018/0295522 A1* | 10/2018 | Wong | H04W 16/14 |
| 2019/0132776 A1* | 5/2019 | Markwart | H04W 36/16 |
| 2019/0215698 A1* | 7/2019 | Balachandran | H04W 72/0453 |

OTHER PUBLICATIONS

Wireless Innovation Forum, Signaling Protocols and Procedures for Citizens Broadband Radio Service (CBRS): Spectrum Access System (SAS)—Citizens Broadband Radio Service Device (CBSD) Interface Technical Specification; WINNF-TS-0016, V1.2.1, Jan. 3, 2018, 60 pages.

(Continued)

*Primary Examiner* — Minjung Kim
(74) *Attorney, Agent, or Firm* — Leffler Intellectual Property Law, PLLC

(57) ABSTRACT

A method for monitoring performance of Cooperative Periodic Activity between Spectrum Access Systems, CPAS, process in a network operating Citizens Broadband Radio Service, CBRS. The method comprises performing a first check of a status of a transmission Grant of a Citizens Broadband Radio service Device, CBSD at the start of the CPAS process and if the result of the first check indicates that the Grant is suspended then performing a second check of the status of said transmission Grant at the end of the CPAS process. The method further comprises raising an alarm if the result of the second check indicates that the Grant is suspended. An apparatus and a network implementing the method are also disclosed.

20 Claims, 6 Drawing Sheets

(51) Int. Cl.
    *H04W 28/26*     (2009.01)
    *H04W 88/18*     (2009.01)

(56)     References Cited

OTHER PUBLICATIONS

Wireless Innovation Forum, "Spectrum Sharing Committee Policy and Procedure Coordinated Periodic Activities Policy", WINNF-SSC-0008-V1.1.0, 2018, 3 pages.
Wireless Innovation Forum, "Test and Certification for Citizens Broadband Radio Service (CBRS); Conformance and Performance Test Technical Specification; SAS as Unit Under Test (UUT)", WINNF-TS-0061, V1.5.0, Apr. 29, 2019, 193 pages.
Wireless Innovation forum Webinar Series, "Webinar #21: CBRS Baseline Standards", Feb. 22, 2018, 69 pages.
Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", WINNF-TS-0016, V1.2.2, Oct. 1, 2018, 60 pages.

\* cited by examiner

METHOD AND APPARATUS FOR MONITORING SAS CPAS PERFORMANCE IN CBRS SYSTEMS

TECHNICAL FIELD

The present invention relates to communications networks, in general, and in particular to operating a communications network using part of the spectrum allocated to Citizens Broadband Radio Service.

BACKGROUND

In the USA, the 3.6 GHz (3550 MHz to 3700 MHz) band is already in use by prior incumbents (e.g. US Federal Government for Naval radar systems and Department of Defence or existing license holders) but may be used by others (e.g. telecom operators) where and when not needed by the US government. The Citizens Broadband Radio Service (CBRS) is an initiative that aims to allow this part of the spectrum to be shared. Telecom operators might be able to deploy 4G and 5G wireless networks using the CBRS.

This is done using a component called a Spectrum Access System (SAS) which allocates frequencies and transmission power to individual Citizens Broadband Radioservice Devices (CBSDs) based on measurements and interference modelling calculations. The CBSDs request permission to transmit, and grants are assigned to each CBSD giving frequency and transmission power. These grants are polled to check whether they (CBSD devices) are authorized to transmit and the polling (called heartbeating) gives an authorization to transmit for a few minutes with each heartbeat. This mechanism is described in more detail in reference W.

The SAS is the key component that allows the spectrum of the 3.6 GHz band to be shared, but Spectrum Access Systems are provided by multiple vendors and the vendors must synchronize their SASs to allow interference modelling to occur between vendors' equipment. This is done using so called Cooperative Periodic Activity between SASs (CPAS) described in reference [2]. Before CPAS process is complete the CBSD will get a grant but the grant will not be authorized until the CPAS process has confirmed the grant with the neighbouring Spectrum Access Systems.

The CPAS process is opaque and is not easy to monitor and a failure of the CPAS process will prevent the CBSDs from transmitting.

SUMMARY

According to a first aspect of the present disclosure there is provided a method of monitoring performance of Cooperative Periodic Activity between Spectrum Access Systems, CPAS, process in a network operating Citizens Broadband Radio Service, CBRS. The method comprises performing a first check of a status of a transmission Grant of a Citizens Broadband Radio service Device, CBSD at the start of the CPAS process. Then, if the result of the first check indicates that the Grant is suspended the method comprises performing a second check of the status of said transmission Grant at the end of the CPAS process. Further the method comprises raising an alarm if the result of the second check indicates that the Grant is suspended.

Preferably the method comprises starting a timer at the start of the CPAS process, wherein the timer expires at the expected completion of the CPAS process.

The method may be performed based on information on a single Grant from one CBSD. Alternatively, a plurality of instances of the method may be performed for a plurality of CBSDs.

In an alternative embodiment the method may be performed based on information on plurality of Grants from a plurality of CBSDs, the plurality of CBSDs being associated with the same SAS, wherein the alarm is raised if Grants are suspended at the beginning and at the end of the CPAS process for more than one of the CBSDs.

The method may be performed at a Domain Proxy, wherein a Domain Proxy, a CBSD or a SAS. A Domain Proxy, DP, represents one or more CBSDs to the SAS.

According to a second aspect of the present disclosure there is provided an apparatus for monitoring performance of Cooperative Periodic Activity between Spectrum Access Systems, CPAS, process in a network operating Citizens Broadband Radio Service, CBRS. The apparatus comprises a processing circuitry and a memory. The memory contains instructions executable by the processing circuitry such that the apparatus is operative to perform a first check of a status of a transmission Grant of a Citizens Broadband Radio service Device, CBSD at the start of the CPAS process. The apparatus is also operative to perform a second check of the status of said transmission Grant at the end of the CPAS process if the result of the first check indicates that the Grant is suspended. Further, the apparatus is operative to raise an alarm if the result of the second check indicates that the Grant is suspended.

Preferably, the apparatus is operative to start a timer at the start of the CPAS process, wherein the timer expires at the expected completion of the CPAS process.

Preferably, the apparatus is operative to use information on a single Grant from one CBSD for monitoring performance of the CPAS process.

Alternatively, the apparatus is operative to use information on plurality of Grants from a plurality of CBSDs, wherein the plurality of CBSDs being associated with the same SAS, and to raise the alarm if Grants are suspended at the beginning and at the end of the CPAS process for more than one of the CBSDs.

The apparatus may comprise a Domain Proxy, a CBSD or a SAS, wherein a Domain Proxy, DP, is operative to represent one or more CBSDs to the SAS.

According to a third aspect of the present disclosure there is provided an apparatus for monitoring performance of Cooperative Periodic Activity between Spectrum Access Systems, CPAS, process in a network operating Citizens Broadband Radio Service, CBRS. The apparatus is adapted to perform a first check of a status of a transmission Grant of a Citizens Broadband Radio service Device, CBSD at the start of the CPAS process and perform a second check of the status of said transmission Grant at the end of the CPAS process if the result of the first check indicates that the Grant is suspended. Further, the apparatus is adapted to raise an alarm if the result of the second check indicates that the Grant is suspended.

According to a fourth aspect of the present disclosure there is provided a communications network comprising an apparatus for monitoring performance of Cooperative Periodic Activity between Spectrum Access Systems, CPAS, process in a network operating Citizens Broadband Radio Service, CBRS. The apparatus comprises a processing circuitry and a memory. The memory contains instructions executable by the processing circuitry such that the apparatus is operative to perform a first check of a status of a transmission Grant of a Citizens Broadband Radio service Device, CBSD at the start of the CPAS process and to perform a second check of the status of said transmission Grant at the end of the CPAS process if the result of the first check indicates that the Grant is suspended. Further, the apparatus is operative to raise an alarm if the result of the second check indicates that the Grant is suspended.

The communications network according to any one of claims 16-19 comprising a Domain Proxy, wherein a Domain Proxy, DP, is operative to represent one or more CBSDs to the SAS.

BRIEF DESCRIPTION OF THE DRAWINGS

The solution disclosed in this document will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the disclosed solution. However, it will be apparent to those skilled in the art that the disclosed solution may be practiced in other embodiments that depart from these specific details. In other instances, detailed descriptions of well-known devices, circuits, and methods are omitted so as not to obscure the description of the disclosed solution with unnecessary details.

Reference throughout the specification to "one embodiment" or "an embodiment" means that a particular feature, structure, or characteristic described in connection with an embodiment is included in at least one embodiment of the present solution. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
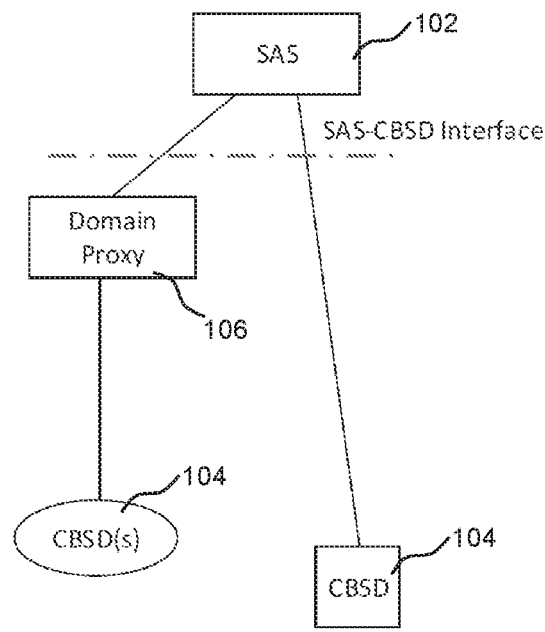
FIG. 1 is a diagram illustrating an interface for communication between a SAS and CBSD devices or Domain Proxies.

FIG. 1 illustrates an interface for communication between a Spectrum Access System, 102, and CBSD devices, 104, or Domain Proxies (DP), 106, which represent one or more CBSD devices, 104, to the SAS, 102, as described in [1]. A Spectrum Access System, 102, is a system that authorises and manages the use of the CBRS spectrum by CBSD devices, 104. A CBSD device, 104, is a radio device which transmits and receives wireless communication in the CBRS band. It may be, for example, a radio base station (e.g. eNodeB) of a wireless network operator capable of operating in the spectrum assigned to this network operator as well as in the CBRS band when authorised by the SAS, 102.

Figure 2:
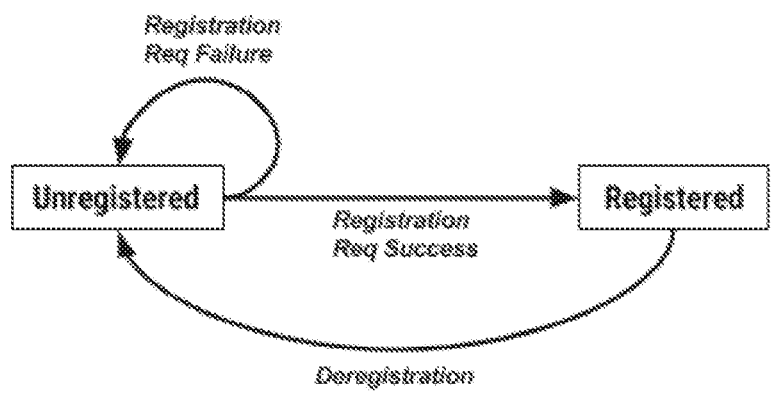
FIG. 2 is a diagram illustrating transitions between unregistered and registered states of a CBSD.

A CBSD device in order to operate in the CBRS band must first register with a SAS. To register, the CBSD device sends a Registration Request Message to the SAS. The information sent in the Registration Request Message includes CBSD's power capabilities, location, and antenna characteristics. The SAS may approve the request and the CBSD transitions from the initial unregistered state to the registered state. If the SAS rejects the request the CBSD remains in the unregistered state. A registered CBSD will transition back to the unregistered state if it changes its location or antenna characteristics, if it sends a Deregister Request Message or if the SAS orders deregistration for other reasons. These states and transitions are illustrated in FIG. 2.

Figure 3:
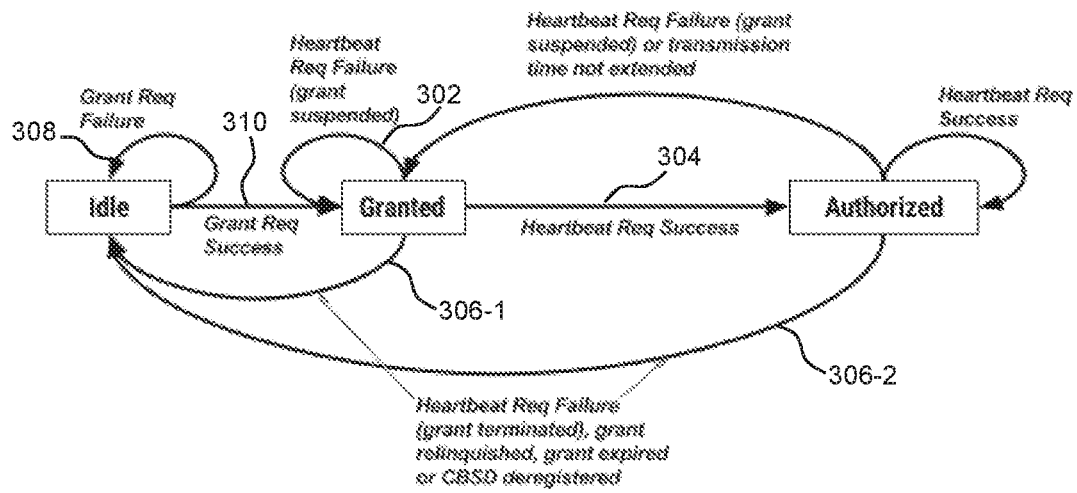
FIG. 3 is a diagram illustrating transitions between states of a request to transmit in CBRS band.

The CBSD is not allowed to operate in the CBRS band just yet (i.e. transitioning to the registered state is not enough). States and transitions leading to the CBSD being allowed to transmit and receive in the CBRS band are illustrated in FIG. 3. A registered CBSD must first send a Grant Request Message to the SAS with which it is registered. A CBSD with no Grant approved is in an Idle state and a CBSD with at least one Grant approved is in a Granted state. A CBSD may request more than one Grant from its SAS. A CBSD with a Grant that is ready to commence operation in the CBRS band (i.e. in the Granted state) sends a Heartbeat Request associated with the Grant. If the SAS responds with a Heartbeat Response (Grant suspended), 302, the CBSD cannot start operation in the CBRS band but continues sending Heartbeat Request associated with the Grant until a Heartbeat Response (success), 304, or Heartbeat Response (Grant terminated), 306-1, is received. Heartbeat Response (success), 304, transitions the state to Authorized and the CBSD, while authorised, is allowed to start transmitting and receiving in the CBRS band for the duration of the grant. If a subsequent Heartbeat Request message(s) is (are) responded with Heartbeat Response (success), 304, the CBSD continues its operation. If the CBSD in the Authorised state receives Heartbeat Response (Grant terminated), 306-2, message it transitions to the Idle state. While in the Idle state the CBSD may send the Grant Request Message to the SAS with which it is registered and if the request fails, 308, the CBSD remains in the Idle state. If the request is successful, 310, the CBSD transitions to the Granted state.

Figure 4:
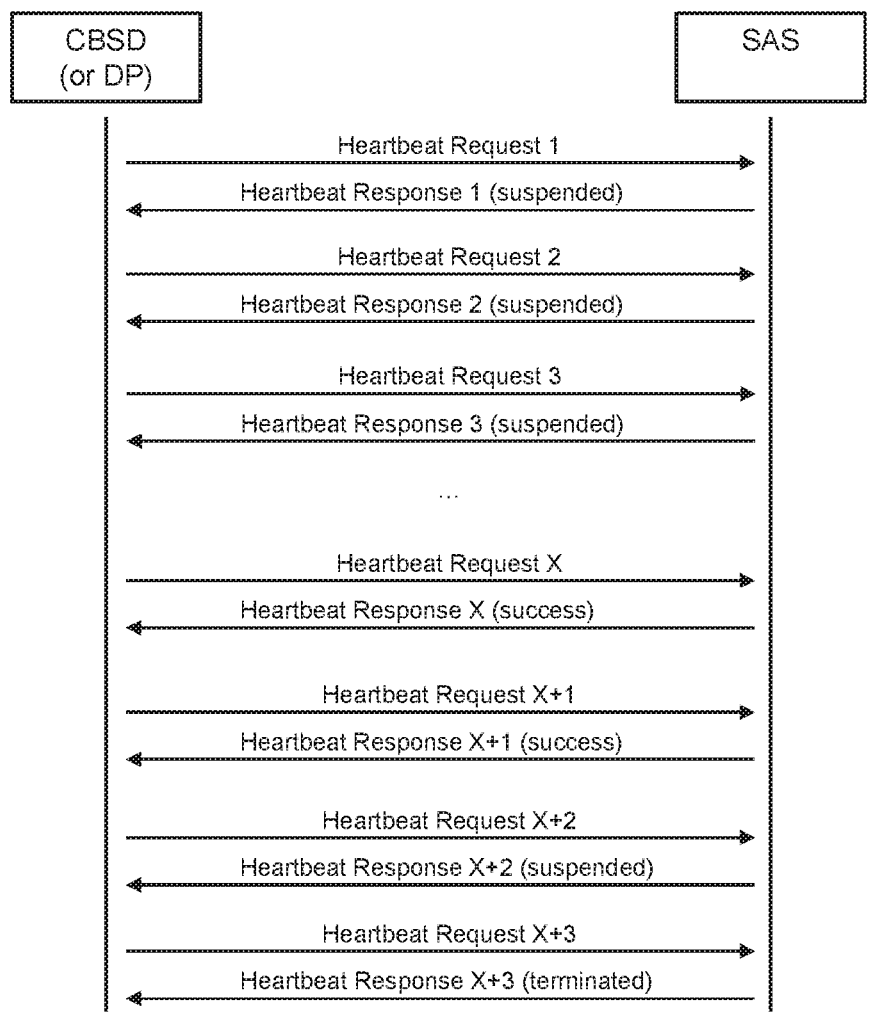
FIG. 4 is a diagram illustrating exchange of Heartbeat Requests and Heartbeat Responses between CBSD and SAS.

As illustrated in FIG. 4 there may be multiple Heartbeat Requests sent until a success Heartbeat Response is received and then Heartbeat requests are continued to be transmitted by the CBSD. As long as a "success" response is received the CBSD is allowed to operate. The authorization allows to transmit for a defined period (e.g. few minutes) with each heartbeat. This is why the request must be renewed and this is illustrated in FIG. 4 by the periodic transmission of the Heartbeat Requests.

Another periodic process operating in CBRS is the Cooperative Periodic Activities among SASs (CPAS) [2] process mentioned earlier. The full cycle of CPAS is typically 24 hours and during this process each SAS performs a Full Dump Record that include information about all CBSDs with at least one active Grant, all existing Grants, location and antenna characteristics of the CBSDs as well as other information. The information produced in Full Dump Record is then accessed by all other SAS devices (other Spectrum Access Systems) so that each SAS has the details of all remaining SAS devices. As explained earlier, SASs are provided by multiple vendors and the vendors must synchronize their SASs to allow interference modelling to be performed between vendors' equipment. As a result of the CPAS process certain grants may be terminated for various reasons, for example:

When conflicts between Grants are discovered, e.g. CBSDs having approved grants from multiple SASs;

Grants whose frequency ranges are partially or fully overlapping with certain Exclusion Zones (CBSD band used by the Federal Government).

The inventors realised that because a failure of the CPAS process (resulting in Grant(s) remaining suspended) prevents the CBSD from operating there is a need for a solution using the CPAS process as a key performance indicator which should be monitored, and which should trigger an alarm when a CPAS process failure is detected. For the CPAS process to result in terminating Grant(s) is not a failure of the CPAS. In a successfully completed CPAS process the Grant is either authorised or terminated. If the CPAS process fails, the Grant is suspended until the other SASs can be consulted and this prevents the CBSD from operating.

As it is now defined in the CBRS and CPAS specifications [1] and [2] there are two periodic processes running in a CBRS system:

1. CBSD-SAS Heartbeat Request/Heartbeat Response exchange process with periodicity of several minutes. The period of Heartbeat Requests is determined by local conditions—in particular by the CBSD being located inside or outside an exclusion zone. Range may be 60 seconds to 5 minutes.
2. CPAS process with Full Dump Record performed by each SAS and filtering out of Grants than need to be terminated or suspended as defined in reference [2]. The CPAS process is repeated with a 24-hour period.

If the CPAS process run on a SAS fails, the Grants already active on this SAS will be suspended. The CPAS process may fail for example due to: transmission problems, storage limitations or excessive server load. There may be other reasons for the CPAS process failure, but the cause of the CPAS process failure does not affect the operation of the present solution. Suspending a Grant may be caused for various reasons, some are legitimate and well defined in the technical documentation, e.g. conflicts with other Grants or frequency range overlap discussed earlier, whereas suspending Grants caused by a CPAS failure prevents the system from operating even if the conditions for Grant suspension defined in the CPAS process are not met. This results in wasting unused radio resources.

Figure 5:
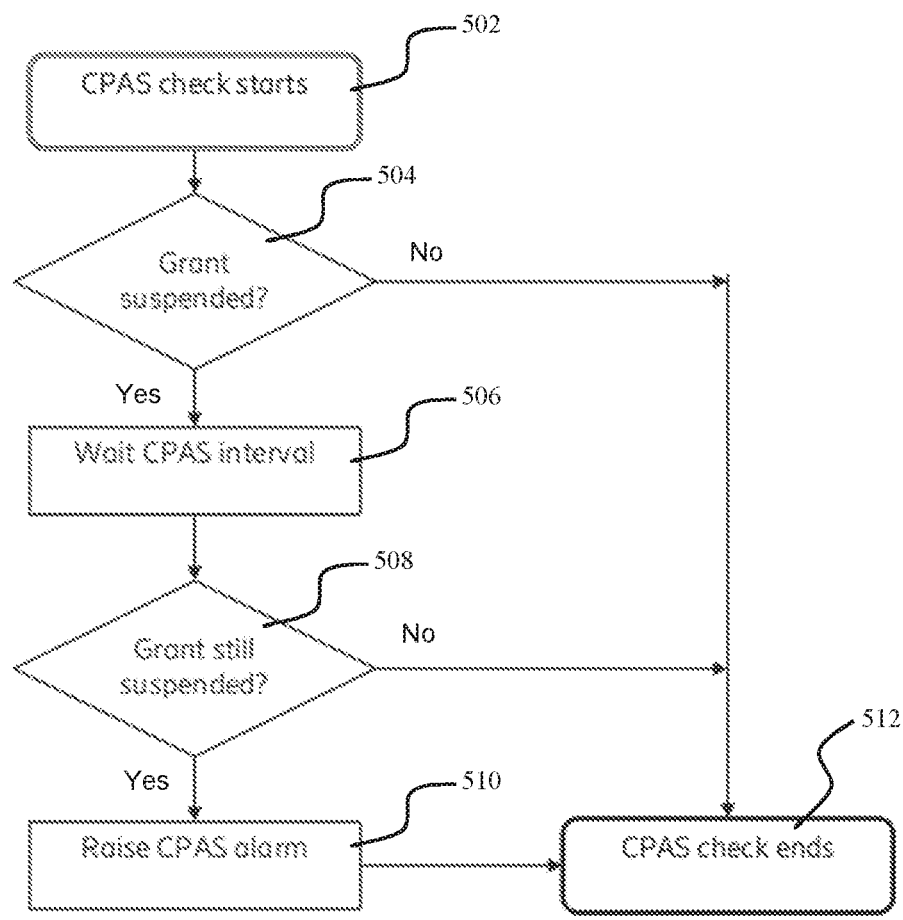
FIG. 5 is a diagram illustrating one embodiment of a method of monitoring performance of CPAS process in CBRS.

Further, the inventors realised that the possibility to identify and react to a CPAS failure on a 24-hour basis is not satisfactory (this is when it would have been revealed that the CPAS process at a particular SAS failed). To address this problem, it is proposed to introduce a CPAS timer which triggers checking if a grant is suspended at a beginning and end of a CPAS interval (controlled by the CPAS timer). The CPAS timer is substantially shorter than the 24-hours of the full CPAS process. If, indeed, the grant is suspended at the beginning and the end of the CPAS interval then an alarm may be raised which, in turn, may trigger corrective actions much earlier. This process is illustrated in FIG. 5 and will be described in more detail in connection with description of a network illustrated in FIG. 6.

Figure 6:
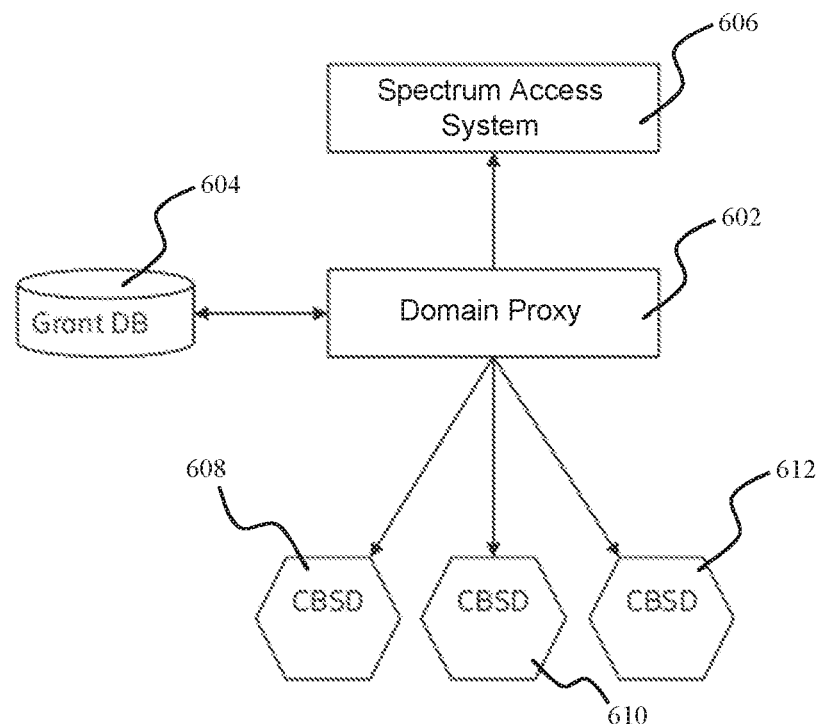
FIG. 6 is a diagram illustrating one embodiment of a network operating in accordance with embodiments of the method illustrated in FIG. 5.

In one embodiment, illustrated in FIG. 6, a function of a Domain Proxy 602 is used to fetch and maintain information indicative of Grants from the SAS 606. The information indicative of the Grants is maintained in a database 604 and polled (heartbeat) against the SAS 606, and the authorization to transmit is used to control the CBSDs 608-612. The information stored in the Grant database 604 can be used to monitor SAS function, including Cooperative Periodic Activity between SASs (CPAS) functionality. Although the database 604 is illustrated as a separate unit it may, in some embodiments, be part of the Domain Proxy, 602, or other elements of the network operative to perform the method described in this document.

In one embodiment, a timer, preferably in the Domain Proxy, is used to keep track of when the CPAS process is run on the SAS, and how long it should take (this is called CPAS interval). This can be used to predict correct CPAS behavior and to warn the network operator via an alarm or KPI when the CPAS fails.

The current version of document [2] describes the CPAS process and specifies seven operations which are triggered at times T1, T2, T3 and T3+300 seconds. The times T1, T2 and T3 are determined and agreed upon by the SAS administrators. In alternative embodiments (and future versions of the document [2]) the number of operations in the CPAS process may be different than seven and the number of times specified for performing these operations may also be different. These changes, however, would not change the operations of the present solution.

In a preferred embodiment of the method, illustrated in FIG. 5, the CPAS interval is the time needed for completing the operations of the CPAS process. At commencement of the CPAS interval, 502, each Grant is checked, 504 if it is not suspended. If, 504-No, the Grant has been authorized to transmit no further action is taken for this grant, 512. If the Grant exists but has been suspended since the commencement of the CPAS interval (i.e. no transmission is authorized), 504—Yes, then the system waits for the CPAS interval, 506, to allow the SAS to complete the CPAS operation. If, at the end of the CPAS interval, the Grant is still allowed but the SAS has still not authorized transmission (resulting in the Grant still being suspended), 508—Yes, then the CPAS has failed and the system raises an alarm, 510. If, at the end of the CPAS interval the Grant is no longer suspended, 508-No, the Grant is authorized. No further action is taken for this grant, 512. In a preferred embodiment the method may be performed in the Domain Proxy, 602, and in alternative embodiments the method may be performed in CBSD devices, 608-612, or even in the SAS, 606. When the method performed in a CBSD there is one instance of the method running in the CBSD for the CBSD (preferably in each one of the CBSDs 608-612). Irrespective of where the method is executed it may be executed for one CBSD or, in an alternative embodiment, it may be executed for multiple CBSDs.

If the SAS concludes during CPAS that no transmission is possible then the grant will be terminated. Termination of a Grant is not a fault condition.

CPAS failures can be distinguished from other problems with obtaining a Grant to transmit, allowing new Grants to be requested where needed.

The important step here is to use the state of the Grants given and knowledge of the timing of the CPAS process in the SAS to deduce the success or failure of CPAS operation.

This information is not provided by the SAS but may be inferred from SAS behavior. The method described is a way to monitor SAS behavior just from the information required by the SAS-CBSD specification. For example, if the Grant Request was successful the Grant is active, transmission cannot commence until the CBSD 608 is authorized to transmit as shown in FIG. 3. Therefore, when the CPAS process is performed a Grant suspended at the beginning of the CPAS interval at the end of the CPAS interval is expected to be either terminated for one of the reasons defined in reference [2] or authorized. Termination and authorization indicate that the CPAS process has been performed. If, however, the suspended Grant remains suspended at the end of the CPAS interval then it may indicate that the CPAS process failed and an alarm is raised, 510.

In one embodiment, the alarm is raised, 510, if the same is observed for other CBSDs 610, 612, associated with the Domain Proxy 602 (i.e. Grants being suspended at the beginning and remaining suspended at the end of the CPAS interval). This means that in one embodiment the method described above and illustrated in FIG. 5 is performed for at least two CBSDs associated with the same Domain Proxy (and the same SAS) and the alarm is raised when the CPAS process failure determined for one of the CBSDs is corroborated by the same results for the remaining CBSDs for which the method is executed.

The advantage of this solution is that the CPAS timer (CPAS interval) is substantially shorter than the 24-hours for making the Full Dump Record and hence the operator will be aware of the CPAS failure much earlier and the alarm raised may trigger corrective actions much earlier.

Figure 9:
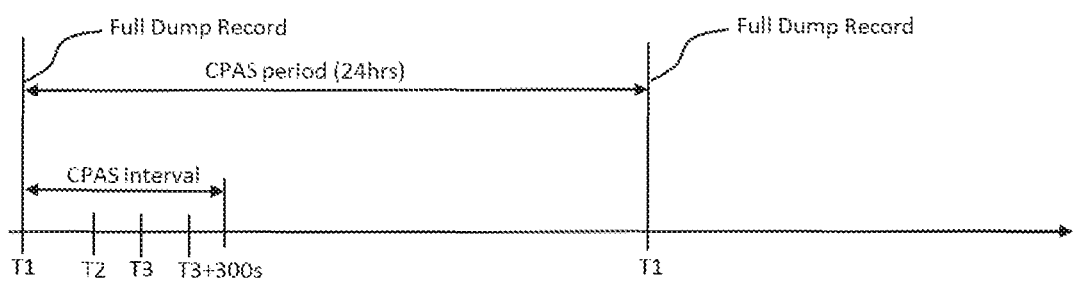
FIG. 9 illustrates timing of the operations of the present solution in one embodiment.

FIG. 9 and the following description will explain the timing of the operations of the present solution in the overall context of the CPAS process. At time T1 the CPAS process starts and each SAS produces a full activity dump (full dump record). This is repeated every 24 hrs. At time T2 each SAS accesses the full dump records of all other SASs. Each SAS filters out Grants that need to be terminated and performs steps needed to terminate these Grants. At time T3 the Grants that need to be terminated are terminated and at time T3+300 seconds remaining Grants are authorized. The value of 300 seconds is set in reference [2], but it may be set at a different value.

The problem the present solution solves is that if the CPAS process fails there may be suspended Grants after the time T3+300 seconds and the next opportunity to find this out is the next full dump record. The times T1, T2 and T3 are to be agreed by SAS administrators, but in any case, from start to complete at the T3+300 seconds it would take much less than 24 hrs, which means that, the Grants suspended at the end of the process would be left undiscovered until the next full dump record. This is why the present solution introduces a check if there are any suspended Grants at T1 (or beginning of CPAS) that are also suspended the end of the CPAS (slightly beyond T3+300 sec), this is the CPAS interval illustrated in FIG. 9. The check is done without waiting 24 hrs, but at much shorter interval (CPAS interval).

Further, the disclosed solution considerably reduces the chance that the alarm will be triggered by incumbent protection problems. So, for example, a Navy boat arriving during the 24-hour period will only trigger the alarm if it arrives between the CPAS interval completing and the CPAS timer expiring. The Navy boat will still stop CBSDs transmitting but the problem will not be mis-identified as a CPAS failure.

Figure 7:
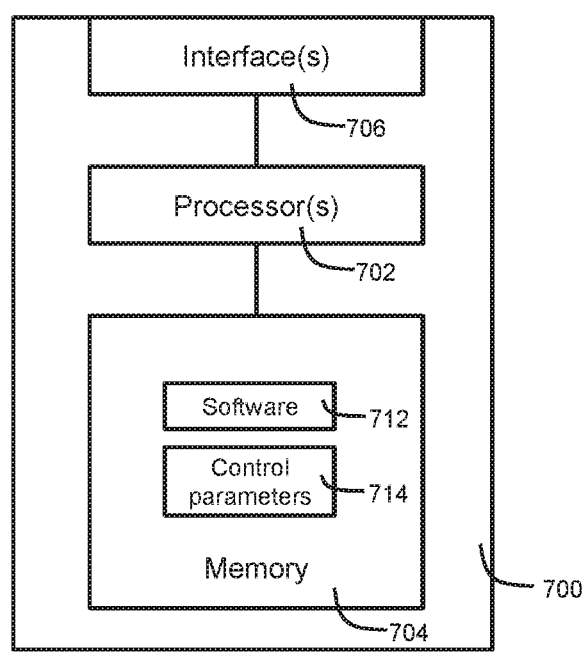
FIG. 7 is a diagram illustrating one embodiment of an apparatus for monitoring performance of CPAS process in CBRS.

FIG. 7 illustrates one embodiment of an apparatus, 700, which implements the method for monitoring performance of Cooperative Periodic Activity between Spectrum Access Systems (CPAS) process in a network operating Citizens Broadband Radio Service (CBRS) described earlier. The apparatus, 700, comprises a processing circuitry, 702, and a memory, 704. The memory, 704, contains instructions executable by the processing circuitry, 702, such that the apparatus, 700, is operative to perform a first check of a status of a transmission Grant of a Citizens Broadband Radio service Device (CBSD) at the start of the CPAS process and to perform a second check of the status of said transmission Grant at the end of the CPAS process, 506, if the result of the first check indicates that the Grant is suspended. Further, the apparatus, 700, is operative to raise an alarm, 510, if the result of the second check indicates that the Grant is suspended, 508—Yes.

The apparatus, 700, may include processing circuitry (one or more than processor) 702 coupled to the interface(s) 706, and to the memory 704. By way of example, the interface(s) 706, the processor(s) 702, and the memory 704 could be connected in series as illustrated in FIG. 7. Alternatively, these components 702, 704 and 706 may be coupled to an internal bus system of the apparatus, 700. The memory 704 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory, 704, may include software, 712, and/or control parameters, 714. The memory, 704, may include suitably configured program code to be executed by the processor(s), 702, so as to implement the above-described method as explained in connection with FIG. 5 and embodiments described in this document.

The interface, 706, is for connecting the apparatus, 700, to other elements of the network operating Citizens Broadband Radio Service (CBRS).

It is to be understood that the structures as illustrated in FIG. 7 are merely schematic and that the apparatus, 700, may actually include further components which, for the sake of clarity, have not been illustrated, e.g., further interfaces or processors. Also, it is to be understood that the memory 704 may include further program code for implementing other and/or known functionalities.

According to some embodiments, also a computer program may be provided for implementing functionalities of the apparatus 700, e.g., in the form of a physical medium storing the program code and/or other data to be stored in the memory 704, or by making the program code available for download or by streaming.

It is also to be understood that the apparatus 700 may be provided as a virtual apparatus 700. In one embodiment, the apparatus 700 may be provided in distributed resources, such as cloud resources. When provided as a virtual apparatus, it will be appreciated that the memory 704, processing circuitry 702, and interface 706 may be provided as functional elements. The functional elements may be distributed in a logical network and not necessarily be directly physically connected. It is also to be understood that the apparatus 700 may be provided as a single-node device, or as a multi-node system.

Figure 8:
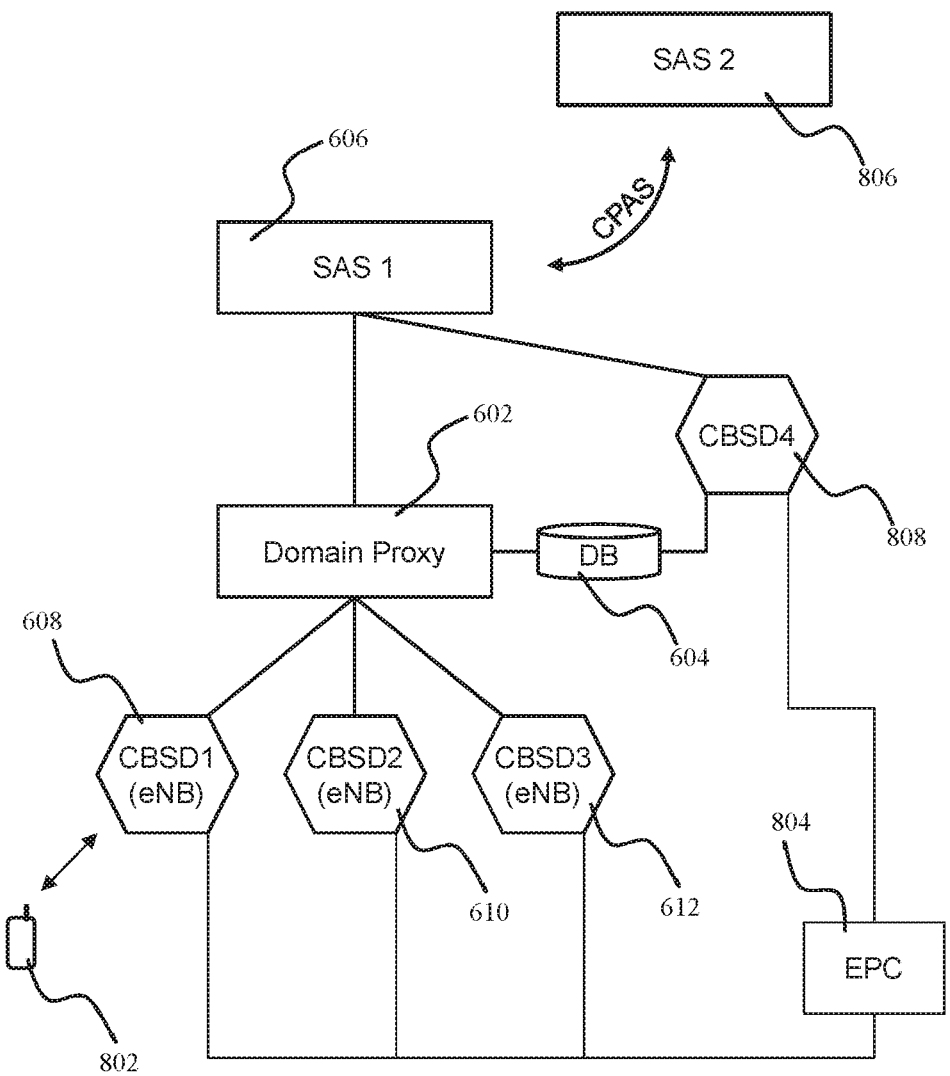
FIG. 8 is a diagram illustrating one embodiment of a network operating in accordance with embodiments of the method illustrated in FIG. 5.

FIG. 8 illustrates one embodiment of a network operating in accordance with embodiments of the method disclosed in this document. FIG. 8 illustrates additional components of a wireless mobile communications network compared with what is illustrated in FIG. 5 to better illustrate the context in which the present solution operates. Network operators may deploy 4G and 5G wireless networks using the CBRS band. For this to work the SAS, 606 and 806, must authorise their associated CBSDs 608-612 and 808. For clarity and brevity FIG. 8 only shows CBSDs associated with SAS 1, 606. Once the CBSDs are authorised they will use the CBRS band, or part of it for which their grants are authorised, for providing service to user equipment 802. In this embodiment the CBSDs 608-612 may be the eNodeBs that normally operate in LTE bands and CBSD 4, 808, may be an access point providing access only in the CBRS band. The CBSDs 608-612 and 808 are connected to the evolved packet core (EPC) network, 804. Cooperation between SAS 1 and SAS 2 in the CPAS process is also illustrated. The same considerations are applicable to 5G networks deployments.

ABBREVIATIONS

CBRS Citizens Broadband Radio Service
CBSD Citizens Broadband Radio service Device
CPAS Cooperative Periodic Activity between SASs
DP Domain Proxy
EPC Evolved Packet Core
SAS Spectrum Access System

REFERENCES

1. "Signaling Protocols and Procedures for Citizens Broadband Radio Service (CBRS): Spectrum Access System (SAS)—Citizens Broadband Radio Service Device (CBSD) Interface Technical Specification", published by WinnForum, document WINNF-TS-0016 Version V1.2.2
2. "Spectrum Sharing Committee Policy and Procedure Coordinated Periodic Activities Policy", published by WinnForum, document WINNF-SSC-0008 Version 1.1.0

The invention claimed is:

1. A method of monitoring performance of Cooperative Periodic Activity between Spectrum Access Systems (CPAS) process in a network operating Citizens Broadband Radio Service (CBRS) the method comprising:
    performing a first check of a status of a transmission Grant of a Citizens Broadband Radio service Device (CBSD) at a start of the CPAS process;
    if the result of the first check indicates that the Grant is suspended then performing a second check of the status of said transmission Grant at an end of the CPAS process; and
    raising an alarm if the result of the second check indicates that the Grant is suspended.
2. The method according to claim 1, further comprising starting a timer at the start of the CPAS process, wherein the timer expires at the expected completion of the CPAS process.
3. The method according to claim 1, performed based on information on a single Grant from one CBSD.
4. The method according to claim 3, wherein a plurality of instances of the method are performed for a plurality of CBSDs.
5. The method according to claim 1, performed based on information on plurality of Grants from a plurality of CBSDs, the plurality of CBSDs being associated with the same Spectrum Access System (SAS), wherein the alarm is raised if Grants are suspended at the beginning and at the end of the CPAS process for more than one of the CBSDs.
6. The method according to claim 1, performed at a Domain Proxy, wherein a Domain Proxy (DP) represents one or more CBSDs to the Spectrum Access System (SAS).
7. The method according to claim 1, performed at a CBSD.
8. The method according to claim 1, performed at a Spectrum Access System (SAS).
9. An apparatus for monitoring performance of Cooperative Periodic Activity between Spectrum Access Systems (CPAS) process in a network operating Citizens Broadband Radio Service (CBRS) the apparatus comprising a processing circuitry and a memory, the memory containing instructions executable by the processing circuitry such that the apparatus is operative to:
    perform a first check of a status of a transmission Grant of a Citizens Broadband Radio service Device (CBSD) at start of the CPAS process;
    perform a second check of the status of said transmission Grant at an end of the CPAS process if the result of the first check indicates that the Grant is suspended; and
    raise an alarm if the result of the second check indicates that the Grant is suspended.
10. The apparatus according to claim 9, further operative to start a timer at the start of the CPAS process, wherein the timer expires at the expected completion of the CPAS process.
11. The apparatus according to claim 9, operative to use information on a single Grant from one CBSD.
12. The apparatus according to claim 9, operative to use information on plurality of Grants from a plurality of CBSDs, the plurality of CBSDs being associated with the same Spectrum Access System (SAS), and to raise the alarm if Grants are suspended at the beginning and at the end of the CPAS process for more than one of the CBSDs.
13. The apparatus according to claim 9, comprising a Domain Proxy (DP), wherein a DP is operative to represent one or more CBSDs to the Spectrum Access System (SAS).
14. The apparatus according to claim 9, comprising a CBSD.
15. The apparatus according to claim 9, comprising a Spectrum Access System (SAS).
16. A communications network comprising an apparatus for monitoring performance of Cooperative Periodic Activity between Spectrum Access Systems (CPAS) process in a network operating Citizens Broadband Radio Service (CBRS) wherein the apparatus comprises a processing circuitry and a memory, the memory containing instructions executable by the processing circuitry such that the apparatus is operative to:
    perform a first check of a status of a transmission Grant of a Citizens Broadband Radio service Device (CBSD) at a start of the CPAS process;
    perform a second check of the status of said transmission Grant at an end of the CPAS process if the result of the first check indicates that the Grant is suspended; and
    raise an alarm if the result of the second check indicates that the Grant is suspended.
17. The communications network according to claim 16, wherein the apparatus is further operative to start a timer at the start of the CPAS process, wherein the timer expires at the expected completion of the CPAS process.
18. The communications network according to claim 16, wherein the apparatus is operative to use information on a single Grant from one CBSD.
19. The communications network according to claim 16, wherein the apparatus is operative to use information on plurality of Grants from a plurality of CBSDs, the plurality of CBSDs being associated with the same Spectrum Access System (SAS), and to raise the alarm if Grants are suspended at the beginning and at the end of the CPAS process for more than one of the CBSDs.

20. The communications network according to claim 16, comprising a Domain Proxy (DP), wherein a DP is operative to represent one or more CBSDs to the Spectrum Access System (SAS).

\* \* \* \* \*

UNITED STATES PATENT AND TRADEMARK OFFICE
CERTIFICATE OF CORRECTION

PATENT NO. : 10,986,507 B2
APPLICATION NO. : 16/712142
DATED : April 20, 2021
INVENTOR(S) : Richardson et al.

Page 1 of 1

It is certified that error appears in the above-identified patent and that said Letters Patent is hereby corrected as shown below:

On the Title Page

In Item (72), under "Inventors", in Column 1, Line 5, delete "Andru M. MacGiolla Ri," and insert -- Andru M. Mac Giolla Ri, --, therefor.

In the Specification

In Column 1, Line 35, delete "W." and insert -- [1]. --, therefor.

In Column 3, Line 67, delete "Domain Proxies (DP)," and insert -- Domain Proxies, (DPs), --, therefor.

In Column 6, Line 53, delete "method" and insert -- method is --, therefor.

Signed and Sealed this
Twelfth Day of July, 2022

Katherine Kelly Vidal
*Director of the United States Patent and Trademark Office*